(12) United States Patent
Dhar et al.

(10) Patent No.: US 12,548,019 B2
(45) Date of Patent: Feb. 10, 2026

(54) QUANTUM CLOUD APPARATUS FOR EVENT EVALUATION AND AUTHORIZATION

(71) Applicant: Bank of America Corporation, Charlotte, NC (US)

(72) Inventors: Partha Sarathi Dhar, Chester Springs, PA (US); Ravi Kiran Hukmani, Hyderabad (IN); Swarn Deep, New Delhi (IN); Kamal Joshi, Uttar Pradesh (IN)

(73) Assignee: Bank of America Corporation, Charlotte, NC (US)

( * ) Notice: Subject to any disclaimer, the term of this patent is extended or adjusted under 35 U.S.C. 154(b) by 139 days.

(21) Appl. No.: 18/107,122

(22) Filed: Feb. 8, 2023

(65) Prior Publication Data
US 2024/0265390 A1    Aug. 8, 2024

(51) Int. Cl.
*G06Q 20/40* (2012.01)
*G06F 21/60* (2013.01)

(52) U.S. Cl.
CPC ......... *G06Q 20/401* (2013.01); *G06F 21/602* (2013.01); *G06F 21/606* (2013.01)

(58) Field of Classification Search
CPC .... G06Q 20/401; G06F 21/602; G06F 21/606
See application file for complete search history.

(56) References Cited

U.S. PATENT DOCUMENTS

| | | | |
|---|---|---|---|
| 10,872,341 B1 | 12/2020 | Beckman et al. | |
| 10,929,888 B1 | 2/2021 | Sterling et al. | |
| 11,195,177 B1 | 12/2021 | Vijayvergia | |
| 11,538,010 B2 | 12/2022 | Post et al. | |
| 2005/0091524 A1 | 4/2005 | Abe et al. | |
| 2010/0094791 A1 | 4/2010 | Miltonberger | |
| 2015/0019401 A1* | 1/2015 | Kollur | G06Q 40/03 705/38 |
| 2015/0026027 A1 | 1/2015 | Priess et al. | |
| 2017/0060629 A1* | 3/2017 | Vora | G06F 9/542 |
| 2018/0032827 A1 | 2/2018 | Boutet et al. | |
| 2018/0260245 A1* | 9/2018 | Smith | G06F 9/542 |
| 2018/0262489 A1* | 9/2018 | Wadley | H04L 63/083 |
| 2019/0385170 A1 | 12/2019 | Arrabothu et al. | |
| 2020/0211570 A1 | 7/2020 | Novack et al. | |

(Continued)

*Primary Examiner* — Eduardo Castilho
*Assistant Examiner* — Karlyannie M. Garcia
(74) *Attorney, Agent, or Firm* — Banner & Witcoff, Ltd.

(57) ABSTRACT

Aspects of the disclosure relate to quantum cloud computing. A computing platform may receive an event processing request from a user. The computing platform may obtain, via a first API, external consumer data corresponding to the user. The computing platform may generate, based on the external consumer data, a response code, indicating whether or not the external consumer data is authenticated. The computing platform may generate, based on the response code, response information, indicating whether or not to process the event processing request. Based on identifying that the response information indicates that the event processing request should be processed, the computing platform may send, to an enterprise computing device, one or more commands directing the enterprise computing device to process the event processing request, which may cause the enterprise computing device to process the event processing request.

18 Claims, 8 Drawing Sheets

(56) References Cited

U.S. PATENT DOCUMENTS

| | | |
|---|---|---|
| 2021/0067337 A1* | 3/2021 | Bahrami .................. H04L 9/06 |
| 2021/0097523 A1 | 4/2021 | Phillips et al. |
| 2021/0241279 A1 | 8/2021 | Patten, Jr. et al. |
| 2021/0326836 A1 | 10/2021 | Hanson et al. |
| 2021/0357940 A1 | 11/2021 | Benkreira et al. |
| 2021/0385194 A1* | 12/2021 | Kulkarni ............... H04L 63/104 |
| 2021/0406902 A1 | 12/2021 | Bernert et al. |
| 2022/0067744 A1 | 3/2022 | Rodriguez Bravo et al. |
| 2022/0147970 A1 | 5/2022 | Babcock et al. |
| 2022/0237591 A1 | 7/2022 | Omojola et al. |
| 2022/0300971 A1 | 9/2022 | Cowen et al. |
| 2022/0405362 A1* | 12/2022 | Yanamala ............... G06N 10/60 |
| 2022/0405753 A1 | 12/2022 | Lee et al. |

* cited by examiner

405

Event Processing Approval

This request has been approved for processing – please proceed.

Event Processing Denial

This request has been denied for processing – no further action should be taken with regard to this request.

FIG. 5

QUANTUM CLOUD APPARATUS FOR EVENT EVALUATION AND AUTHORIZATION

BACKGROUND

Aspects of the disclosure relate to event evaluation and authorization. In some instances, event processing requests may be evaluated to identify whether or not to process the given request. In some instances, to do so, complex data may be obtained from dispersed technology platforms and subsequently analyzed. In some instances, there may be significant delays associated with both obtaining the data and/or performing the analysis. Such delay may provide an opportunity for malicious activity to occur (e.g., in a period of time between the event processing request being submitted and the request being explicitly denied). In these instances, although the request may ultimately be denied based on the analysis, the damage may already be done. Accordingly, it may be important to devise systems and methods that reduce the delay associated with event processing evaluation.

SUMMARY

Aspects of the disclosure provide, effective, efficient, scalable, and convenient technical solutions that address and overcome the technical problems associated with event evaluation and authentication techniques. In accordance with one or more illustrative embodiments of the disclosure, a quantum cloud computing platform comprising at least one processor, a communication interface, and memory storing computer-readable instructions may receive an event processing request from a user. The computing platform may obtain, via a first application programming interface (API), external consumer data corresponding to the user, which may include establishing, using a second API a secure communication channel over which the external consumer data may be sent and/or encrypting, using a third API, the external consumer data. The computing platform may generate, based on the external consumer data, a response code. The computing platform may generate, based on the response code, response information, where the response information may indicate whether or not to process the event processing request. Based on identifying that the response information indicates that the event processing request should be processed, the computing platform may send, to an enterprise computing device, one or more commands directing the enterprise computing device to process the event processing request, which may cause the enterprise computing device to process the event processing request.

In one or more instances, obtaining the external consumer data may include obtaining, from a private cloud environment, the external consumer data. In one or more instances, the external consumer data may be one or more of: a credit score, an unauthorized activity score, or a risk score from a third party vendor.

In one or more examples, the computing platform may obtain, from the enterprise computing device, internal consumer data, comprising one or more of: a name, an address, a social security number, a date of birth, or a phone number. In one or more examples, the event processing request may be a request to increase a credit limit for the user.

In one or more instances, the first API, the second API, and the third API may be cloud based instances. In one or more instances, the quantum cloud computing platform may be configured to communicate with the first API, the second API, and the third API via a cloud based connection module.

In one or more examples, the computing platform may authenticate the external consumer data, which may include changing a state of the quantum cloud computing platform from a network API state corresponding to the first API to a quantum API state corresponding to the second API. In one or more examples, the second API may be configured to access public cloud resources. In one or more examples, the response code may be generated in real time.

BRIEF DESCRIPTION OF DRAWINGS

The present disclosure is illustrated by way of example and not limited in the accompanying figures in which like reference numerals indicate similar elements and in which:

FIGS. 4-5 depict example graphical user interfaces for implementing a quantum cloud apparatus for event evaluation and authorization in accordance with one or more example embodiments.

DETAILED DESCRIPTION

Figure 1A:
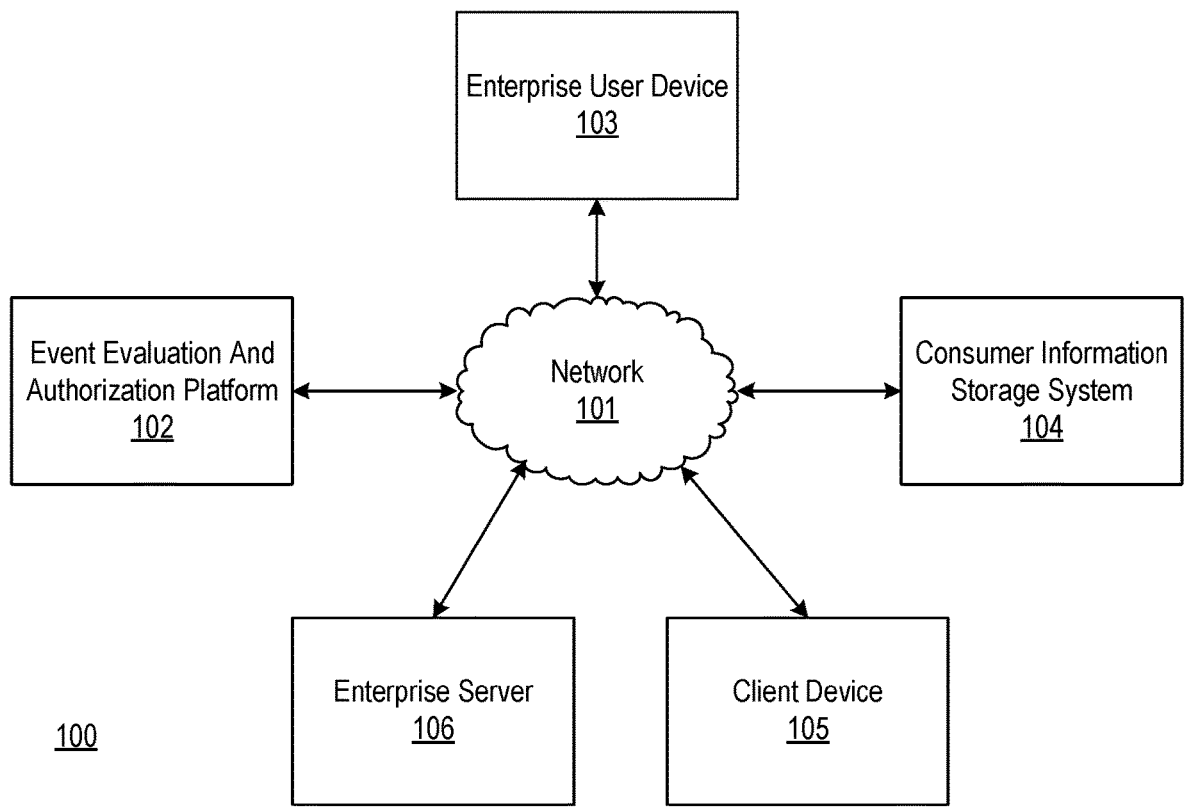
FIGS. 1A and 1B depict an illustrative computing environment for implementing a quantum cloud apparatus for event evaluation and authorization in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

One or more aspects of the disclosure relate to a quantum cloud apparatus for event evaluation and authorization. For example, a credit underwriting system may process unauthorized activity feeds generated from different systems including batch jobs from systems of records. The underwriting system may use unauthorized activity evaluation services to check the unauthorized activity status and process requests accordingly. Due to complexities in data and dispersed technology platforms, it may take significant amounts of time (e.g., up to ninety six hours, or the like) for the unauthorized activity evaluation process to be completed. In the meantime, unauthorized activity may occur with the corresponding account. Based on the results of the unauthorized activity evaluation, the respective account may be shut down and/or otherwise have a payment hold initiated, however, at this point in time unauthorized activity may have already occurred.

Accordingly, described herein is a multi-tiered communication system for cloud provisioning and quantum encryption, which may be a virtual private cloud computing system for client underwriting decision platforms. The cloud computing environment platform may enable client devices residing on various client networks to access one or more cloud computing services. The cloud computing service may include cloud computing resources managed by a cloud computing platform for client underwriting decisioning platforms that may include superstations, various cloud networks, and/or other devices/components. The platform may be configured to take workload and automatically provide the interfaces and access steps to operate the workload on any particular platform infrastructure elements within cloud computing resources. A quantum cloud application programming interface (API) provisioning module may be configured to access virtual private cloud computing resources. A cloud service bus may receive the communication, parse the actions, and/or utilize the cloud model data store to resolve the action to the appropriate one or more cloud computing API services. Once the appropriate services are identified, the cloud services bus may route the instructions to an elastic fabric adapter which then may transform the action to more than one communication for execution. In some instances, adapters may include virtual machine software that may be used as an interface with a virtual machine cloud computing environment that may be configured on a host based firewall for running any of the application communication channels. In some instances, a quantum secured API encryption cloud environment (public) network may be accessed with provisioning and via a data channel.

In doing so, the solution described herein may significantly reduce unauthorized evaluation response times by leveraging cloud quantum gates. Furthermore, the security of unauthorized applications may be increased by using a multi-tiered cloud application for provisioning. In some instances, this unauthorized activity evaluation/risk detection may apply to new applications for deposits, merchants, consumer cards, credit limit increases, and/or otherwise.

Figure 1B:
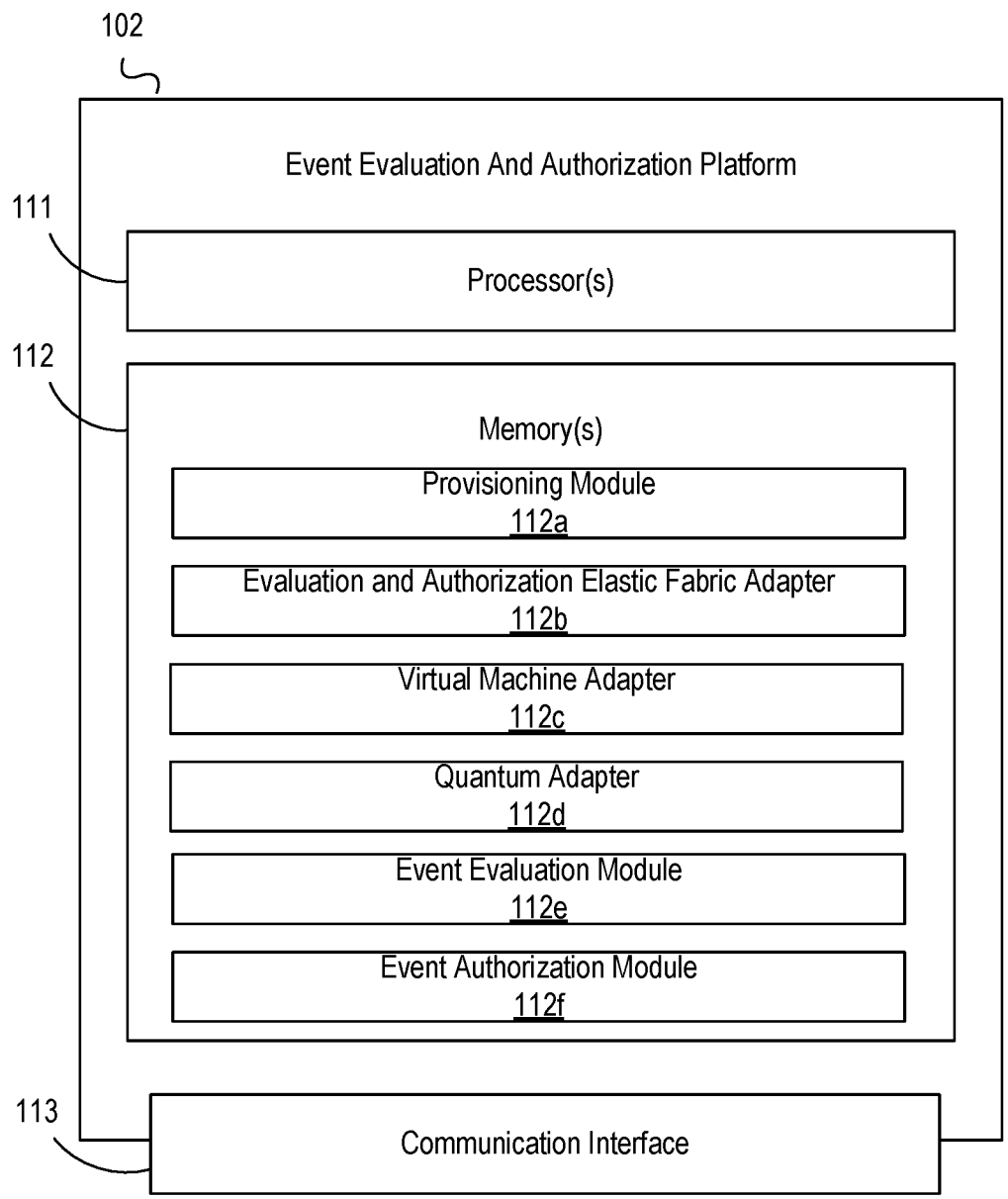

FIGS. 1A-1B depict an illustrative computing environment for implementing a quantum cloud apparatus for event evaluation and authorization in accordance with one or more example embodiments. Referring to FIG. 1A, computing environment 100 may include one or more computer systems. For example, computing environment 100 may include event evaluation and authorization platform 102, enterprise user device 103, consumer information storage system 104, client device 105, and enterprise server 106.

As described further below, event evaluation and authorization platform 102 may be a cloud based quantum computer system that includes one or more computing devices and/or other computer components (e.g., processors, memories, communication interfaces). Event evaluation and authorization platform 102 may be configured with one or more APIs that may be used to obtain, authenticate, and/or otherwise encrypt consumer data that may be used to evaluate an event processing request and whether or not the request should be authorized. In some instances, in doing so, the event evaluation and authorization platform 102 may produce error codes, which may be used to produce error information indicating whether or not a given request should not be processed.

Enterprise user device 103 may be and/or include a desktop computer, a laptop computer, a tablet, a mobile device, and/or other device. In some instances, the enterprise user device 103 may be configured for use by an employee of an organization (e.g., such as an underwriter of a financial institution) in order to process requests (e.g., requests to make deposits, merchant requests, consumer card requests, line of credit requests, and/or other requests). In some instances, enterprise user device 103 may cause display of and/or otherwise present one or more graphical user interfaces (e.g., which may e.g., indicate whether or not to process a given request, or the like). Although a single enterprise user device is shown, any number of enterprise user devices may be included in the environment 100 without departing from the scope of the disclosure.

Consumer information storage system 104 may be a computer system that includes one or more computing devices (e.g., servers, server blades, or the like) and/or other computer components (e.g., processors, memories, communication interfaces) configured to store and/or otherwise manage consumer information. For example, the consumer information storage system 104 may store credit score history information, risk information, and/or other information. Although a single consumer information storage system 104 is depicted, any number of such systems may be included in the environment 100 without departing from the scope of the disclosure.

Client device 105 may be and/or include a desktop computer, a laptop computer, a tablet, a mobile device, and/or other device. In some instances, the client device 105 may be configured for use by a client (e.g., of the organization corresponding to the event evaluation and authorization platform 102) to make and/or otherwise submit event processing requests (e.g., requests to make deposits, merchant requests, consumer card requests, line of credit requests, and/or other requests). In some instances, client device 105 may cause display of and/or otherwise present one or more graphical user interfaces (e.g., event processing approvals and denials, and/or other interfaces). Although a single client device is shown, any number of client devices may be included in the environment 100 without departing from the scope of the disclosure.

Enterprise server 106 may be a computer system that includes one or more computing devices (e.g., servers, server blades, or the like) and/or other computer components (e.g., processors, memories, communication interfaces) configured to store and/or otherwise manage consumer information (e.g., internal consumer information such names, addresses, social security numbers, dates of birth, phone numbers, and/or other internally stored consumer information). Additionally, enterprise server 106 may be configured to facilitate communications (e.g., such as event processing requests) between client devices such as client device 105 and/or the event evaluation and authorization platform 102. Although illustrated as being distinct from the event evaluation and authorization platform 102, in some instances, the enterprise server 106 may be part of and/or otherwise integrated into the event evaluation and authorization platform 102.

Computing environment 100 also may include one or more networks, which may interconnect event evaluation and authorization platform 102, enterprise user device 103, consumer information storage system 104, client device 105, and enterprise server 106. For example, computing environment 100 may include a network 101 (which may interconnect, e.g., event evaluation and authorization platform 102, enterprise user device 103, consumer information storage system 104, client device 105, and enterprise server 106).

In one or more arrangements, event evaluation and authorization platform 102, enterprise user device 103, consumer information storage system 104, client device 105, and enterprise server 106 may be any type of computing device capable of receiving a user interface, receiving input via the user interface, and communicating the received input to one or more other computing devices. For example, event evaluation and authorization platform 102, enterprise user device 103, consumer information storage system 104, client device 105, enterprise server 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of event evaluation and authorization platform 102, enterprise user device 103, consumer information storage system 104, client device 105, and enterprise server 106 may, in some instances, be special-purpose computing devices configured to perform specific functions.

Referring to FIG. 1B, event evaluation and authorization platform 102 may include one or more processors 111, memory 112, and communication interface 113 (e.g., connection module). A data bus may interconnect processor 111, memory 112, and communication interface 113. Communication interface 113 may be a network interface configured to support communication between event evaluation and authorization platform 102 and one or more networks (e.g., network 101, or the like). Memory 112 may include one or more program modules having instructions that when executed by processor 111 cause event evaluation and authorization platform 102 to perform one or more functions described herein and/or one or more databases that may store and/or otherwise maintain information which may be used by such program modules and/or processor 111. In some instances, the one or more program modules and/or databases may be stored by and/or maintained in different memory units of event evaluation and authorization platform 102 and/or by different computing devices that may form and/or otherwise make up event evaluation and authorization platform 102. For example, memory 112 may have, host, store, and/or include a provisioning module 112a, evaluation and authorization elastic fabric adapter 112b, virtual machine adapter 112c, quantum adapter 112d, event evaluation module 112e, and event authorization module 112f. Provisioning module 112a may have instructions that direct and/or cause event evaluation and authorization platform 102 to communicate with the enterprise server 106 to obtain and authenticate internal consumer information. Evaluation and authorization elastic fabric adapter 112b may be configured to access an authentication payment elastic fabric adapter API, which may be configured to obtain external consumer information (e.g., from the consumer information storage system 104). Virtual machine adapter 112c may be configured to access an authentication payment virtual machine operations center API, which may be configured to establish a secure communication channel between the event evaluation and authorization platform 102 and/or one or more API instances. Quantum adapter 112d may be configured to access an authentication payment quantum API, which may be configured to encrypt the external consumer information. Event evaluation module 112e may have instructions that direct and/or cause the event evaluation and authorization platform 102 to generate, based on the external consumer information, error codes. Event authorization module 112f may have instructions that direct and/or cause the event evaluation and authorization platform 102 to generate, based on the error codes, response information indicating whether or not a requested event should be processed. Accordingly, the above described components may cause the event evaluation and authorization platform 102 to perform enhanced event evaluation and authorization methods, as described further below.

Although a number of components are illustrated as being included within the event evaluation and authorization platform 102, such components may, in some instances, be included in different/separate devices without departing from the scope of the disclosure.

Figure 2A:
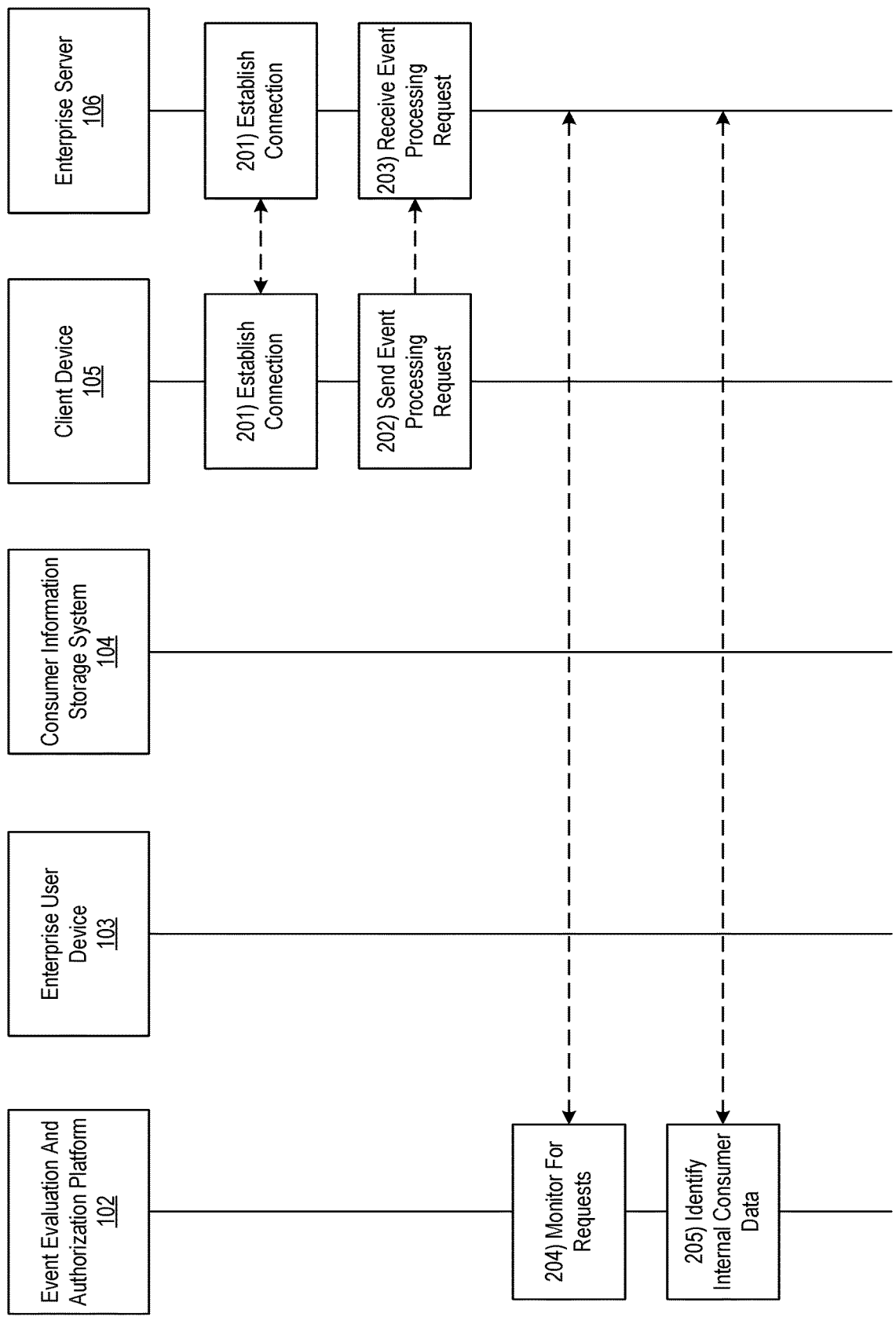
FIGS. 2A-2D depict an illustrative event sequence for implementing a quantum cloud apparatus for event evaluation and authorization in accordance with one or more example embodiments.

FIGS. 2A-2D describe an illustrative event sequence for implementing a quantum cloud apparatus for event evaluation and authorization in accordance with one or more example embodiments. Referring to FIG. 2A, at step 201, client device 105 may establish a connection with the enterprise server 106. For example, the client device 105 may establish a first wireless data connection with the enterprise server 106 to link the client device 105 to the enterprise server 106 (e.g., in preparation for sending event processing requests). In some instances, the client device 105 may identify whether or not a connection is already established with the enterprise server 106. If a connection is already established with the enterprise server 106, the client device 105 might not re-establish the connection. Otherwise, if a connection is not yet established with the enterprise server 106, the client device 105 may establish the first wireless data connection as described herein.

At step 202, the client device 105 may send an event processing request to the enterprise server 106. For example, the client device 105 may send a request to make a deposit, open a consumer card, perform one or more actions on behalf of a merchant, raise a credit limit, and/or perform other actions. In some instances, the client device 105 may send the event processing request to the enterprise server 106 while the first wireless data connection is established.

At step 203, the enterprise server 106 may receive the event processing request. For example, the enterprise server 106 may receive the event processing request while the first wireless data connection is established.

At step 204, the event evaluation and authorization platform 102 may monitor the enterprise server 106 to detect event processing requests. Upon detecting the event processing request, the event evaluation and authorization platform 102 may proceed to step 205.

At step 205, the event evaluation and authorization platform 102 may identify internal consumer data corresponding to the user of the client device 105. For example, the event evaluation and authorization platform 102 may use the provisioning module 112a to communicate with the enterprise server 106 to obtain such information. In obtaining the internal consumer data, the event evaluation and authorization platform 102 may identify names, addresses, social security numbers, dates of birth, phone numbers, balance information, account information, and/or other information. In some instances, in communicating with the enterprise server 106, the evaluation and authorization platform 102 may communicate with one or more servers corresponding to a private cloud affiliated with the evaluation and authorization platform 102.

Figure 2B:
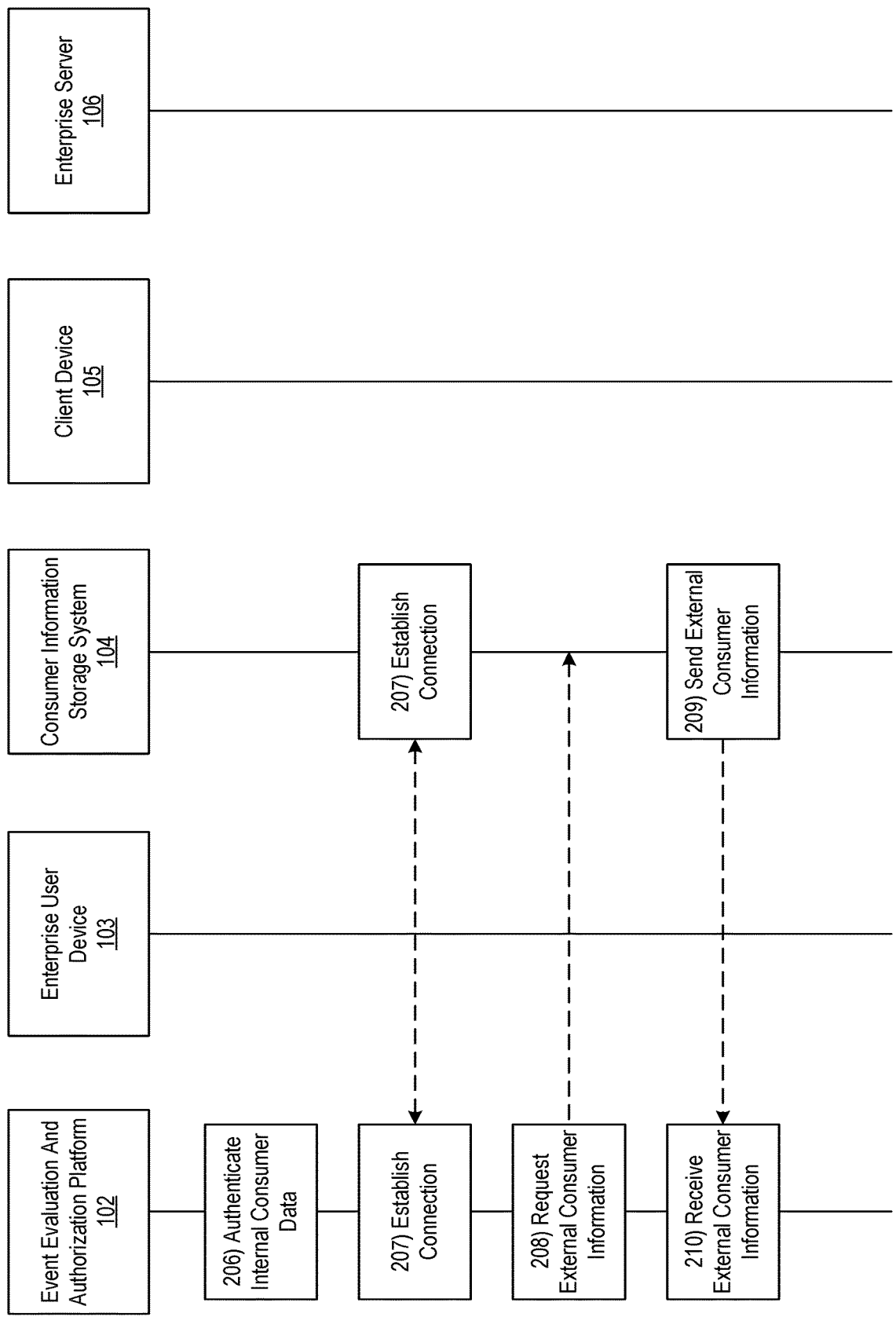

Referring to FIG. 2B, at step 206, the event evaluation and authorization platform 102 may authenticate the internal consumer data identified at step 205. For example, the event evaluation and authorization platform 102 may confirm whether or not the user is authorized to make the event processing request (e.g., whether the user is (or appears to be) the authorized user on the account corresponding to the event processing request). If the event evaluation and authorization platform 102 identifies that the internal consumer data is not authenticated, event evaluation and authorization platform 102 may proceed to step 212 (e.g., to generate response information indicating that the event should not be processed). Otherwise, if the internal consumer data is authenticated, the event evaluation and authorization platform 102 may proceed to step 207.

At step 207, event evaluation and authorization platform 102 and consumer information storage system 104 may establish a connection with the consumer information storage system 104. For example, the event evaluation and authorization platform 102 may establish a second wireless data connection is established with the consumer information storage system 104 (e.g., in preparation for requesting external consumer information). In some instances, the event evaluation and authorization platform 102 may identify whether or not a connection is already established with the consumer information storage system 104. If a connection is already established with the consumer information storage system 104, the event evaluation and authorization platform 102 might not re-establish the connection. Otherwise, if a connection is not yet established with the consumer information storage system 104, the event evaluation and authorization platform 102 may establish the second wireless data connection as described herein.

At step 208, the event evaluation and authorization platform 102 may request external consumer information from the consumer information storage system 104. For example, the event evaluation and authorization platform 102 may utilize the evaluation and authorization clastic fabric adapter 112*b* to access a cloud based API instance (e.g., an authentication unauthorized payment clastic fabric adapter API instance, or the like), which may, e.g., be configured to send one or more API requests to the consumer information storage system 104 to obtain the external consumer information. For example, the event evaluation and authorization platform 102 may request credit history reports/scores, risk scores, unauthorized activity scores, and/or other information. In some instances, the event evaluation and authorization platform 102 may request the external consumer information via the communication interface 113 and while the second wireless data connection is established.

In some instances, in requesting the external consumer information, the event evaluation and authorization platform 102 may request encryption of the external consumer information. For example, the event evaluation and authorization platform 102 may utilize the quantum adapter 112*d* to access a cloud based API instance (e.g., a quantum API authentication unauthorized payment instance, or the like), which may, e.g., be configured to cause encryption of the external consumer information and/or other information. In some instances, the quantum API authentication unauthorized payment instance may further be configured to authenticate the external consumer information. Accordingly, to do so, the event evaluation and authorization platform 102 may change a state of the event evaluation and authorization platform 102 from a state corresponding to the authentication unauthorized payment elastic fabric adapter API instance to a state of the quantum API authentication unauthorized payment instance, which may then be used to perform the authentication.

In some instances, to enable communication between the authentication unauthorized payment elastic adapter API instance, the quantum API authentication unauthorized payment instance, and/or the event evaluation and authorization platform 102, the event evaluation and authorization platform 102 may request the creation of an encrypted provisioning channel. For example, the event evaluation and authorization platform 102 may utilize the virtual machine adapter 112*c* to access a cloud based API instance (e.g., an authentication unauthorized payment virtual machine operations center API instance, which may, e.g., be configured to cause the encrypted provisioning channel to be established).

In some instances, the event evaluation and authorization platform 102 may be configured to communicate with any of the above described cloud based instances via a connection module. For example, each of the above described cloud based instances may be configured with a cloud firewall to otherwise prevent access, however, the connection module may enable communication around and/or otherwise through the firewall. In some instances, any and/or all of the above described instances may be configured as part of a cloud computing platform, with which the event evaluation and authorization platform 102 may communicate and/or which may be part of and/or otherwise integrated into the event evaluation and authorization platform 102. In some instances, the authentication unauthorized payment elastic fabric adapter API instance and/or authentication unauthorized payment virtual machine operations center API instance may correspond to a private cloud environment configured to access private cloud resources, whereas the quantum API authentication unauthorized payment instance may correspond to a public cloud environment configured to access public cloud resources.

At step 209, the consumer information storage system 104 may send the external consumer information to the event evaluation and authorization platform 102. For example, the event evaluation and authorization platform 102 may send an API response to the event evaluation and authorization platform 102 while the second wireless data connection is established.

At step 210, the event evaluation and authorization platform 102 may receive the external consumer information sent at step 209. For example, the event evaluation and authorization platform 102 may receive the external consumer information via the communication interface 113 and while the second wireless data connection is established. In some instances, the event evaluation and authorization platform 102 may receive the external consumer information in an encrypted form (e.g., due to encryption by the authentication unauthorized payment virtual machine operations center API instance as described above). In some instances, communication of the external consumer information to the event evaluation and authorization platform 102 may be supported by the communication channel established by the quantum API authentication unauthorized payment instance as described above.

Figure 2C:
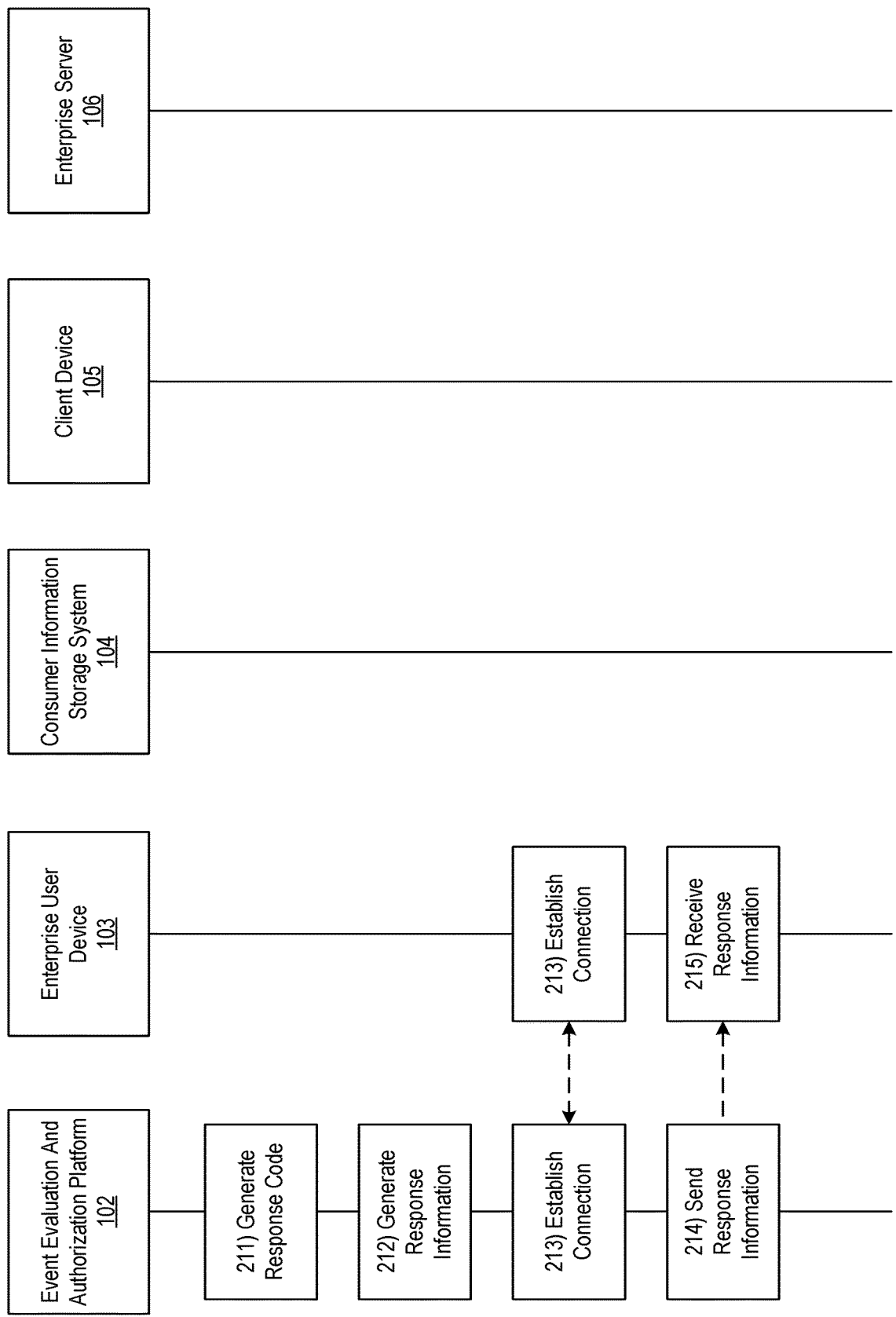

Referring to FIG. 2C, at step 211, based on the external consumer information, the event evaluation and authorization platform 102 may identify a response code. For example, the event evaluation and authorization platform 102 may compare the external consumer information to one or more threshold values, and generate the response code accordingly. For example, different response codes may be generated based on the type of information received (e.g., credit score, risk score, unauthorized activity score, or the like). Additionally or alternatively, different response codes may be generated based on comparison of the external consumer information to one or more thresholds (e.g., a first code if the external consumer information meets or exceeds the one or more thresholds and a second different code if the external consumer information does not meet or exceed the one or more thresholds). In some instances, the event evaluation and authorization platform 102 may identify a plurality of response codes. In some instances, the event evaluation and authorization platform 102 may identify the response code using the event evaluation module 112*e*, which may, e.g., maintain a lookup table that includes ranges for various types of external consumer information and the corresponding response codes. After generating the response code, the event evaluation and authorization platform 102 may pass the response code from the event evaluation module 112e to the event authorization module 112f. In some instances, the event evaluation module 112e and the event authorization module 112f may be integrated into a common or different computing devices.

In some instances, the event evaluation and authorization platform 102 may generate the response code in real time as the event processing request is received. For example, by utilizing the various adapters described above to communicate with one or more cloud based resources using APIs, the event evaluation and authorization platform 102 may significantly improve the response time in which the customer information, needed to authenticate the event processing request, may be obtained, which may allow the response codes to be generated in substantially real time as the requests are received. Furthermore, use of the response codes may further reduce delays corresponding to the authentication process through application of the lookup tables described below. Accordingly, by utilizing quantum computing and cloud based resources, response times may be significantly decreased, which may, e.g., result in improved account security.

At step 212, the event evaluation and authorization platform 102 may generate, using the event authorization module 112f, response information indicating whether or not to approve the event processing request. For example, the event evaluation and authorization platform 102 may maintain a lookup table of response codes and corresponding go/no-go decisions indicating whether or not to proceed on a request with the corresponding response code. Accordingly, the event evaluation and authorization platform 102 may execute a lookup function using the identified response codes to identify whether or not to authorize the event processing request (an indication of which may be included in the response information).

At step 213, the event evaluation and authorization platform 102 may establish a connection with the enterprise user device 103. For example, the event evaluation and authorization platform 102 may establish a third wireless data connection with the enterprise user device 103 to link the event evaluation and authorization platform 102 to the enterprise user device 103 (e.g., in preparation for sending the response information). In some instances, the event evaluation and authorization platform 102 may identify whether or not a connection is already established with the enterprise user device 103. If a connection is already established, the event evaluation and authorization platform 102 might not re-establish the connection. Otherwise, if a connection is not yet established with the enterprise user device 103, the event evaluation and authorization platform 102 may establish the third wireless data connection as described herein.

At step 214, the event evaluation and authorization platform 102 may send the response information to the enterprise user device 103. For example, the event evaluation and authorization platform 102 may send the response information via the communication interface 113 and while the third wireless data connection is established. In some instances, the event evaluation and authorization platform 102 may also send one or more commands directing the enterprise user device 103 to display the response information.

At step 215, the enterprise user device 103 may receive the response information sent at step 214. For example, the enterprise user device 103 may receive the response information while the third wireless data connection is established. In some instances, the enterprise user device 103 may also receive one or more commands directing the enterprise user device 103 to display the response information.

Figure 2D:
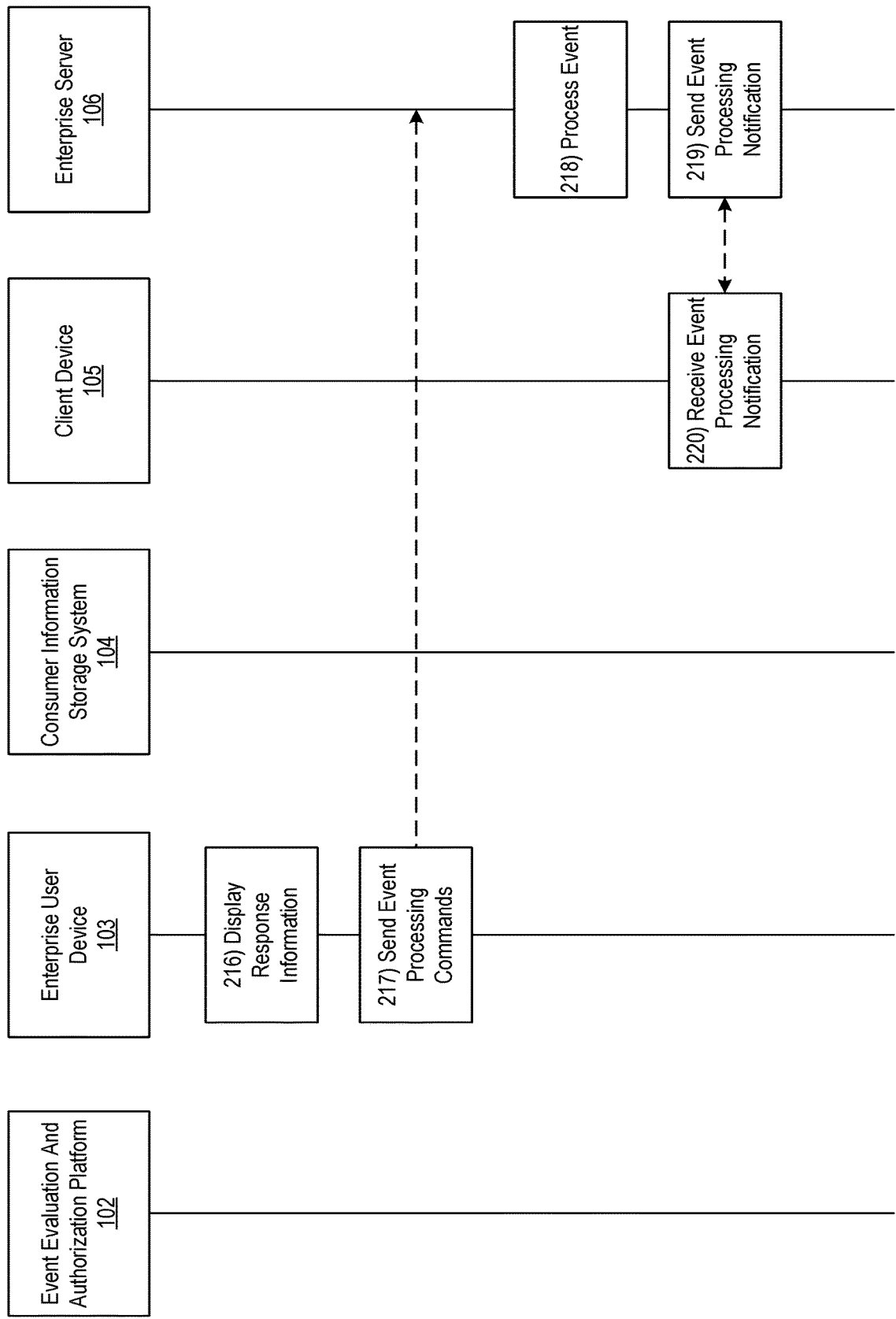

Referring to FIG. 2D, at step 216, based on or in response to the one or more commands directing the enterprise user device 103 to display the response information, the enterprise user device 103 may display the response information. For example, the enterprise user device 103 may display an event processing approval (e.g., as shown in graphical user interface 405 of FIG. 4) or an event processing denial (e.g., as shown in graphical user interface 505 of FIG. 5). In instances where processing of the event was denied, the method may end. In instances where processing of the event was approved, the method may proceed to step 217.

At step 217, the enterprise user device 103 may send one or more commands directing the enterprise server 106 to process the requested event. In some instances, the enterprise user device 103 may send the event processing commands based on or in response to receiving user input requesting approval/processing of the event processing request. Additionally or alternatively, the event processing commands may automatically be sent by the enterprise user device 103 and/or the event evaluation and authorization platform 102 based on the response information indicating that the event is approved for processing.

At step 218, based on or in response to the one or more commands directing the enterprise server 106 to process the requested event, the enterprise server 106 may process the requested event. For example, the enterprise server 106 may cause a credit limit to increase, a deposit to be approved, a merchant request to be approved, a credit card application to be approved, and/or execute other actions.

At step 219, the enterprise server 106 may send an event processing notification to the client device 105 indicating that the requested event was processed. For example, the enterprise server 106 may send the event processing notification to the client device 105 while the first wireless data connection is established. In some instances, the enterprise server 106 may also send one or more commands directing the client device 105 to display the event processing notification.

At step 220, the client device 105 may receive the event processing notification sent at step 219. For example, the client device 105 may receive the event processing notification while the first wireless data connection is established. In some instances, client device 105 may also receive the one or more commands directing the client device 105 to display the event processing notification. In some instances, based on or in response to the one or more commands directing the client device 105 to display the event processing notification, the client device 105 may cause display of the event processing notification.

Figure 3:
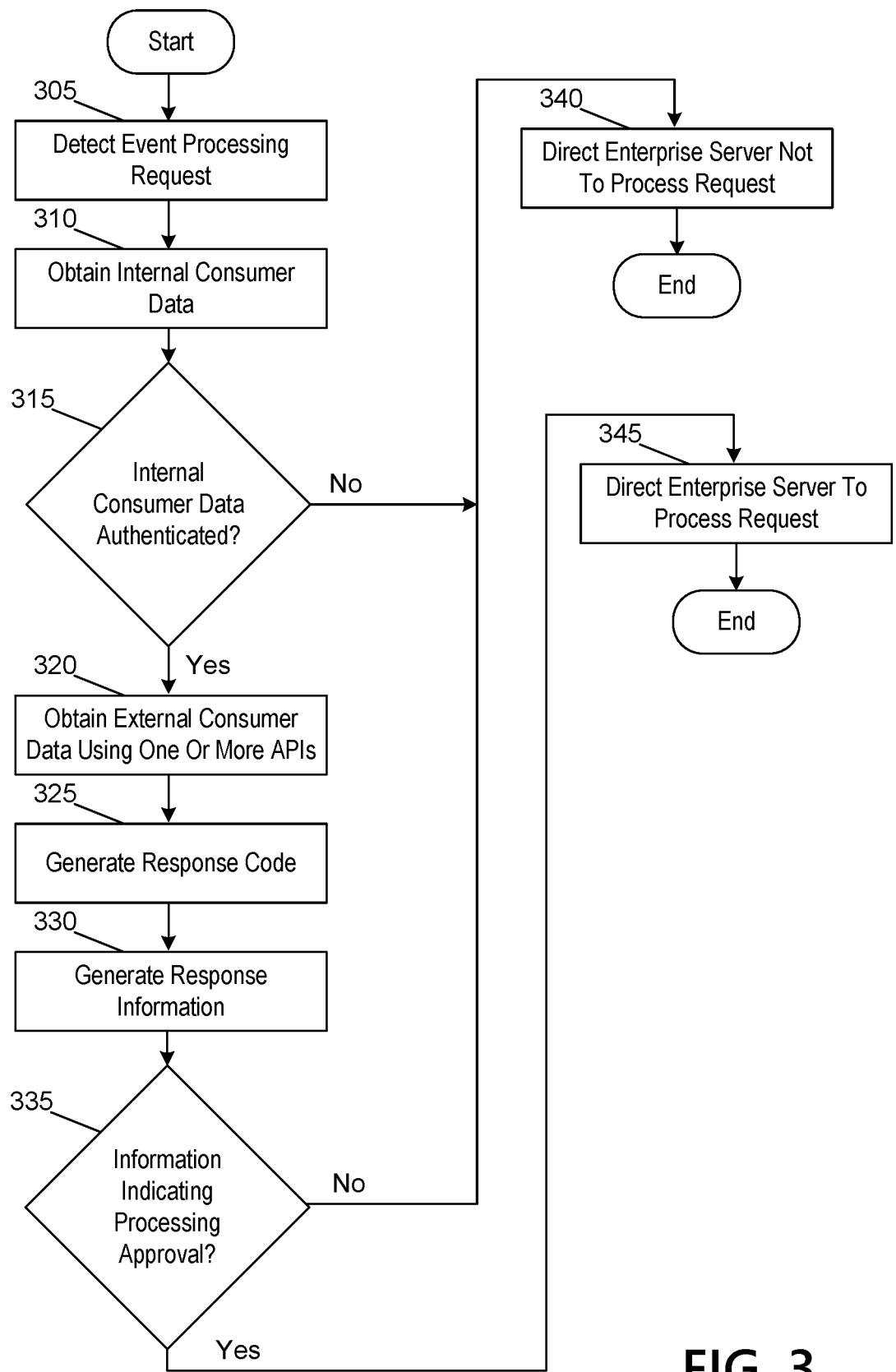
FIG. 3 depicts an illustrative method for implementing a quantum cloud apparatus for event evaluation and authorization in accordance with one or more example embodiments.

FIG. 3 depicts an illustrative method for implementing a quantum cloud apparatus for event evaluation and authorization in accordance with one or more example embodiments. Referring to FIG. 3, at step 305, a computing platform comprising one or more processors, memory, and a communication interface may detect an event processing request. At step 310, the computing platform may obtain internal consumer data. At step 315, the computing platform may identify whether or not the internal consumer data is authenticated. If the internal consumer data is not authenticated, the computing platform may proceed to step 340. At step 340, the computing platform may direct an enterprise server not to process the requested event.

Returning to step 315, if the internal consumer data is authenticated, the computing platform may proceed to step 320. At step 320, the computing platform may obtain external consumer data using one or more APIs. At step 325, the computing platform may generate a response code based on the external consumer data. At step 330, the computing platform may generate response information based on the response code. At step 335, the computing platform may identify whether or not the response information indicates that the requested event should be processed. If the requested event should not be processed, the computing platform may proceed to step 340 (which is described above). If the request event should be processed, the computing platform may proceed to step 345. At step 345, the computing platform may direct an enterprise server to process the requested event.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A quantum cloud computing platform comprising:
at least one processor;
a communication interface communicatively coupled to the at least one processor; and
memory storing computer-readable instructions that, when executed by the processor, cause the quantum cloud computing platform to:
receive an event processing request from a user;
reduce a delay associated with obtaining external consumer data corresponding to the user by:
obtaining, via a first application programming interface (API) and from a plurality of different external systems including at least two systems of record, the external consumer data corresponding to the user, wherein obtaining the external consumer data further comprises:
establishing, using a second API, a secure communication channel over which the external consumer data may be sent, and
encrypting, using a third API, the external consumer data;
change a state of the quantum cloud computing platform from a state of an authentication unauthorized payment elastic fabric adapter API instance to a state of a quantum API authentication unauthorized payment instance;
authenticate, using the quantum API authentication unauthorized payment instance, the external consumer data;
generate, by indexing the external consumer data against a lookup table, a response code, wherein different response codes are generated based on:
types of data of the external consumer data, and
results of a comparison of the external consumer data to a plurality of threshold values;
generate, based on the response code and without permitting unauthorized activity by the user, response information, wherein the response information indicates whether or not to process the event processing request;
based on identifying that the response information indicates that the event processing request should not be processed without experiencing the delay terminate an account associated with the user without permitting the unauthorized activity or processing the event; and based on identifying that the response information indicates that the event processing request should be processed:
  cause a credit limit to increase,
  cause a deposit to be approved,
  cause a merchant request to be approved, and
  cause a credit card application to be approved.

2. The quantum cloud computing platform of claim 1, wherein obtaining the external consumer data comprises obtaining, from a private cloud environment, the external consumer data.

3. The quantum cloud computing platform of claim 1, wherein the external consumer data comprises one or more of: a credit score, an unauthorized activity score, or a risk score from a third party vendor.

4. The quantum cloud computing platform of claim 1, wherein the memory includes additional computer-readable instructions that, when executed by the quantum cloud computing platform cause the quantum cloud computing platform to:
  obtain, from an enterprise computing device, internal consumer data, comprising one or more of: a name, an address, a social security number, a date of birth, or a phone number.

5. The quantum cloud computing platform of claim 1, wherein the event processing request comprises a request to increase a credit limit for the user.

6. The quantum cloud computing platform of claim 1, wherein the first API, the second API, and the third API comprise cloud based instances.

7. The quantum cloud computing platform of claim 6, wherein the quantum cloud computing platform is configured to communicate with the first API, the second API, and the third API via a cloud based connection module.

8. The quantum cloud computing platform of claim 1, wherein the second API is configured to access public cloud resources.

9. The quantum cloud computing platform of claim 1, wherein the response code is generated in real time.

10. A method comprising:
  at a quantum cloud computing platform comprising at least one processor, a communication interface, and memory:
    receiving an event processing request from a user;
    reduce a delay associated with obtaining external consumer data corresponding to the user by:
      obtaining, via a first application programming interface (API) and from a plurality of different external systems including at least two systems of record, the external consumer data corresponding to the user, wherein obtaining the external consumer data further comprises:
        establishing, using a second API, a secure communication channel over which the external consumer data may be sent, and
        encrypting, using a third API, the external consumer data;
    changing a state of the quantum cloud computing platform from a state of an authentication unauthorized payment elastic fabric adapter API instance to a state of a quantum API authentication unauthorized payment instance;
    authenticating, using the quantum API authentication unauthorized payment instance, the external consumer data;
    generating, by indexing the external consumer data against a lookup table, a response code, wherein different response codes are generated based on:
      types of data of the external consumer data, and
      results of a comparison of the external consumer data to a plurality of threshold values;
    generating, based on the response code and without permitting unauthorized activity by the user, response information, wherein the response information indicates whether or not to process the event processing request;
    based on identifying that the response information indicates that the event processing request should not be processed without experiencing the delay, terminate an account associated with the user without permitting the unauthorized activity or processing the event; and
    based on identifying that the response information indicates that the event processing request should be processed:
      causing a credit limit to increase,
      causing a deposit to be approved,
      causing a merchant request to be approved, and
      causing a credit card application to be approved.

11. The method of claim 10, wherein obtaining the external consumer data comprises obtaining, from a private cloud environment, the external consumer data.

12. The method of claim 10, wherein the external consumer data comprises one or more of: a credit score, an unauthorized activity score, or a risk score from a third party vendor.

13. The method of claim 10, wherein the memory includes additional computer-readable instructions that, when executed by the quantum cloud computing platform cause the quantum cloud computing platform to:
  obtain, from an enterprise computing device, internal consumer data, comprising one or more of: a name, an address, a social security number, a date of birth, or a phone number.

14. The method of claim 10, wherein the event processing request comprises a request to increase a credit limit for the user.

15. The method of claim 10, wherein the first API, the second API, and the third API comprise cloud based instances.

16. The method of claim 15, wherein the quantum cloud computing platform is configured to communicate with the first API, the second API, and the third API via a cloud based connection module.

17. The method of claim 10, wherein the second API is configured to access public cloud resources.

18. One or more non-transitory computer-readable media storing instructions that, when executed by a quantum cloud computing platform comprising at least one processor, a communication interface, and memory, cause the quantum cloud computing platform to:
  receive an event processing request from a user;
  reduce a delay associated with obtaining external consumer data corresponding to the user by:
    obtaining, via a first application programming interface (API) and from a plurality of different external systems including at least two systems of record, the external consumer data corresponding to the user, wherein obtaining the external consumer data further comprises:

establishing, using a second API, a secure communication channel over which the external consumer data may be sent, and encrypting, using a third API, the external consumer data;

change a state of the quantum cloud computing platform from a state of an authentication unauthorized payment elastic fabric adapter API instance to a state of a quantum API authentication unauthorized payment instance;

authenticate, using the quantum API authentication unauthorized payment instance, the external consumer data;

generate, by indexing the external consumer data against a lookup table, a response code, wherein different response codes are generated based on:

types of data of the external consumer data, and results of a comparison of the external consumer data to a plurality of threshold values;

generate, based on the response code and without permitting unauthorized activity by the user, response information, wherein the response information indicates whether or not to process the event processing request;

based on identifying that the response information indicates that the event processing request should not be processed without experiencing the delay, terminate an account associated with the user without permitting the unauthorized activity or processing the event; and based on identifying that the response information indicates that the event processing request should be processed:

cause a credit limit to increase, cause a deposit to be approved, cause a merchant request to be approved, and cause a credit card application to be approved.

* * * * *